Nov. 5, 1957   L. TAYLOR   2,812,046
FRICTION CLUTCHES OR BRAKES
Filed May 25, 1955   3 Sheets-Sheet 1
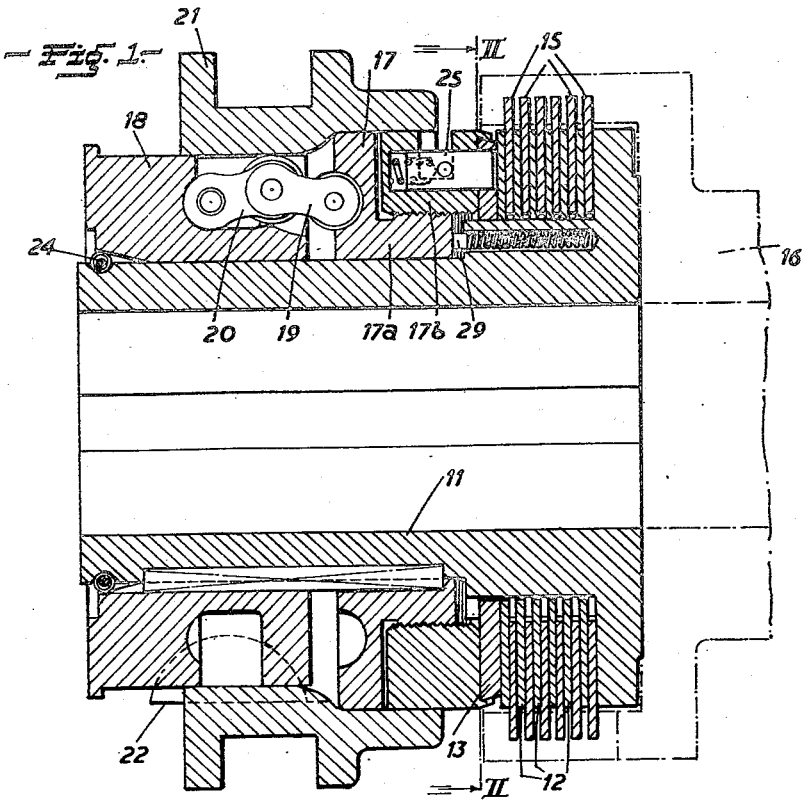
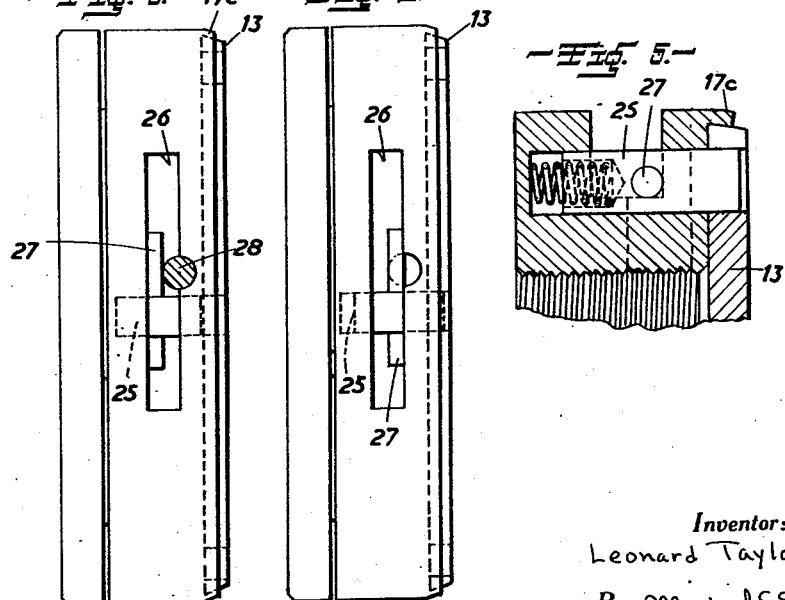
Inventor:
Leonard Taylor
By: Michael S. Striker
   agt.

Nov. 5, 1957    L. TAYLOR    2,812,046
FRICTION CLUTCHES OR BRAKES
Filed May 25, 1955    3 Sheets-Sheet 2
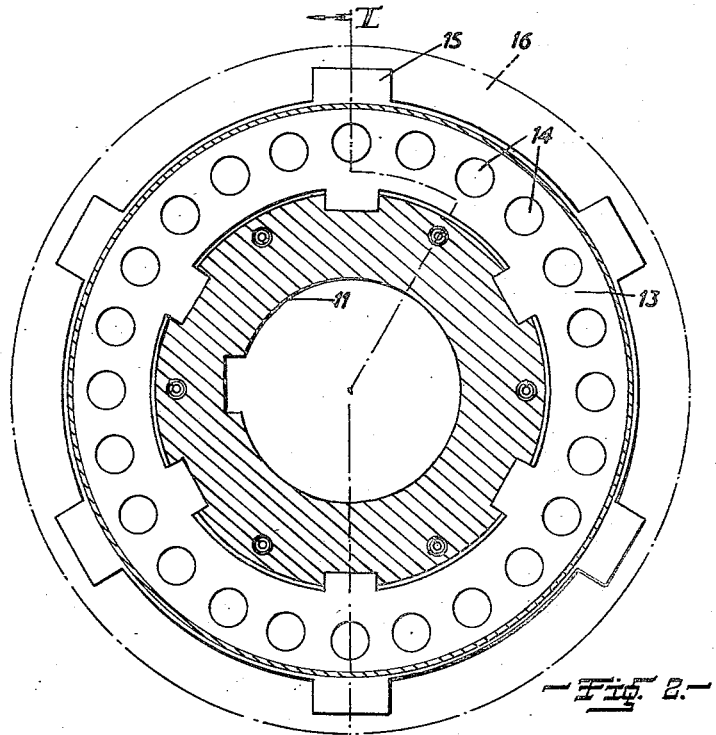
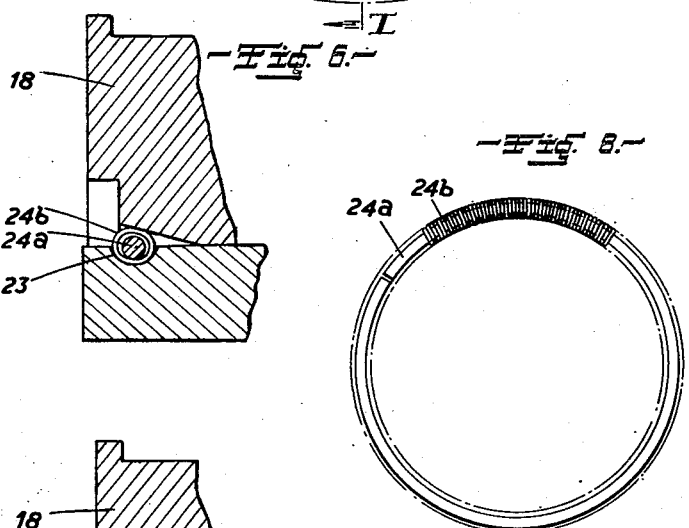
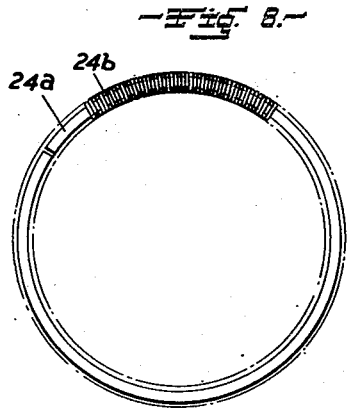
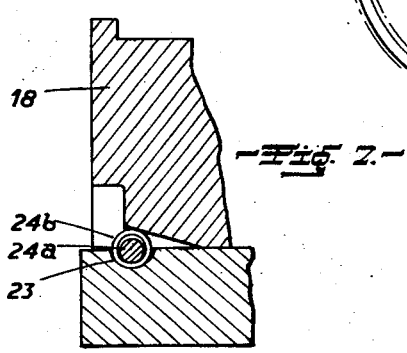
Inventor:
Leonard Taylor
By:
Michael S. Striker
agt.

Nov. 5, 1957  L. TAYLOR  2,812,046
FRICTION CLUTCHES OR BRAKES
Filed May 25, 1955  3 Sheets-Sheet 3
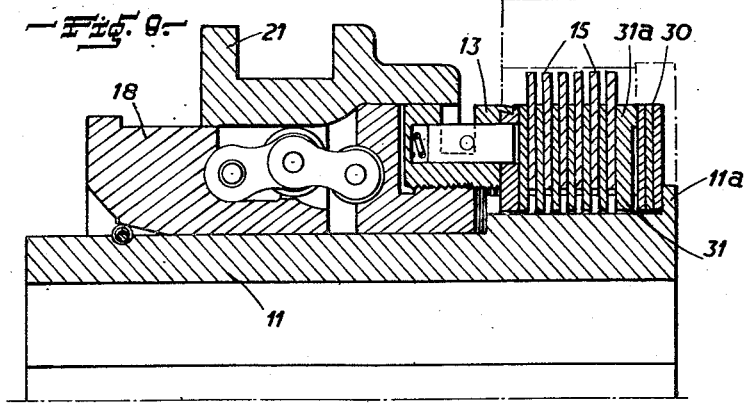
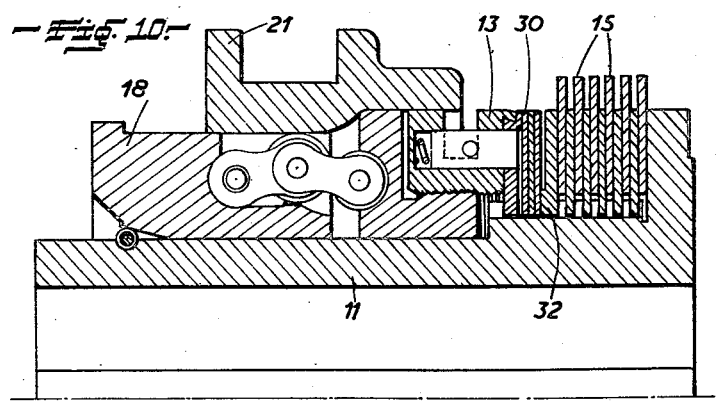
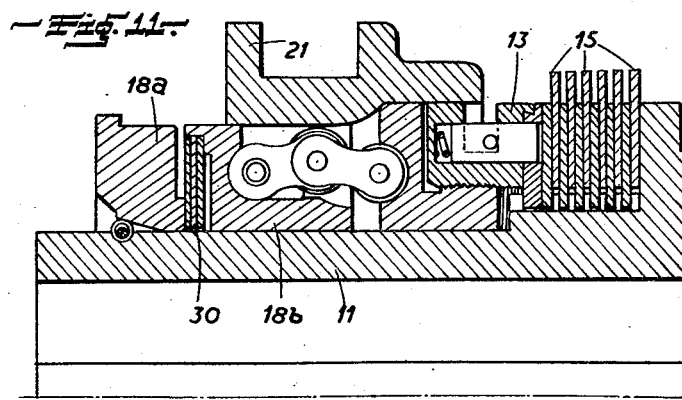
Inventor:
Leonard Taylor
By:
Michael S. Striker
agt.

United States Patent Office 2,812,046
Patented Nov. 5, 1957

2,812,046

FRICTION CLUTCHES OR BRAKES

Leonard Taylor, Rochdale, England

Application May 25, 1955, Serial No. 511,060

12 Claims. (Cl. 192—111)

This invention relates to friction clutches or brakes of the so-called Weston type having an assembly of castellated discs of which alternate discs are rotatable with one part to be clutched (or braked) and the intermediate discs are rotatable with the other part to be clutched (or the brake part), de-clutching (or brake release) being effected by the removal of endwise pressure on such assembly, the several discs then being allowed to free themselves under the influence of spring reaction plungers.

In clutches of this type the endwise pressure is obtained by the straightening out of toggle links arranged between a pair of annular thrust members mounted on a bush or spindle and is removed by allowing those links to flex, the operation of the toggle being effected by sliding a collar or sleeve on to and from the said links (such clutches being referred to hereinafter as "of the type described").

In this type of clutch (the term clutch hereinafter including brakes as well as clutches) it is necessary to eliminate axial play as much as possible, since even a minute amount of wear on each of several discs would entail slip in the clutch and for this purpose provision has been made for advancing the toggle thrust members towards the assembly of discs to take up wear. These thrust members comprise a pair of rings or collars, one of them slidable on a central bush or spindle and one of them (the one furthest from the discs) has hitherto been screwed on to such bush, its rotation on the bush advancing it towards the discs.

It is one object of the present invention to improve the construction of this type of clutch, in particular by eliminating any necessity for cutting a screw thread on the said bush and in the ring or collar adjustable thereon, and yet retain the possibility of taking up wear.

It has been usual in clutches of the type mentioned to provide a locking plate or ring alongside the disc assembly and itself castellated so as to rotate with one set of discs, and such plate has had a number of holes, circumferentially spaced, any one of which could receive a withdrawable locking pin carried on the nearby thrust member for locking the said screw-adjustment of the thrust members. It has been found however that, in some circumstances, the said pin has tended to be withdrawn from the locking plate on disengagement of the clutch, because of failure of the locking plate to follow the thrust member in its retracting movement, and this has prevented proper re-engagement of the clutch if the locking pin has got out of register with the hole from which it has withdrawn.

It is therefore another object of the present invention to eliminate this risk, by constraining the locking plate always to move with its associated thrust member in the engaging and disengaging operation.

According to the present invention in a clutch of the type described the thrust member nearer the discs has an additional part screwed thereto, rotation of which latter, in one sense, causes advancement thereof to increase the effective axial length of the member, and for locking the additional part in set relative position to the main part of said thrust member there is an apertured locking plate associated with the disc assembly and a withdrawable pin associated with said additional part, such plate being held to said thrust member by a turned down flange or the like so as to be retractable with the additional part whilst the latter is free to rotate for adjustment.

Both thrust members may be slidable on a bush or spindle, and the one further from the assembly of discs may be located by means of a resilient split ring member, held in a groove in the bush or spindle.

Conveniently, this last mentioned thrust member has a tapered mouth at its end remote from the other thrust member, the said resilient member being located in said mouth end exerting its axial thrust on the taper surface thereof. In the preferred forms of the invention, the resilient member comprises a closed-coil spring through the centre of which is a split hardened steel core wire.

The invention will now be described further by way of example with reference to the accompanying drawings, in which:

Fig. 1 is a front elevation of a clutch constructed in accordance with the invention, being a section on the line I—I of Fig. 2, Fig. 2 is a sectional end elevation on the line II—II of Fig. 1, Fig. 3 is a detail plan view of part of the clutch shown in Fig. 1, whilst adjustment is taking place, Fig. 4 is a similar view to Fig. 3, after adjustment has been made, Fig. 5 is a detail view of part of the clutch shown in Fig. 1 to a larger scale, Figs. 6 and 7 are further detail views of the end of the clutch shown in Fig. 1, the clutch being engaged and disengaged respectively, Fig. 8 is an end elevation of one of the clutch parts;

Fig. 9 is a detail view showing an alternative construction of certain parts;

Fig. 10 is a detail view showing a further alternative construction of certain parts, and Fig. 11 is a detail view showing a still further alternative construction of certain parts.

In one particular example of the invention illustrated, a central bush 11 (which is one part to be clutched) has a peripheral flange at one end and is of somewhat larger diameter adjacent such flange than elsewhere and is splined there. An assembly of castellated discs 12 is mounted on such splined part of larger diameter, abutting against the flange at one end and having a similarly castellated locking plate 13 at the other end with circumferentially-spaced holes 14. A further assembly of castellated discs 15 are mounted on the other part to be clutched 16, which latter is internally splined for this purpose.

Slidably keyed on the smaller part of the said bush 11 are two rings or collars 17, 18 between which are a number of toggle links 19, 20, each formed of two links from a roller chain as in my earlier specifications aforesaid, and around these collars 17, 18, again is a sliding sleeve 21 having an internal taper surface to engage and depress (straighten) the toggles 19, 20, when moved towards the disc assembly. The said sleeve is slidably keyed to the outermost collar 18 by means of a Woodruff key 22, and is grooved in the usual way for movement by a clutch operating member (not shown).

The collar 18, that is, the one further from the discs 12, 15, has a tapered formation at the mouth, the largest diameter being at the outer end, and around the bush 11, opposite such tapered formation is an annular groove 23 of semi-circular cross-section. In this groove 23 fits a resilient split ring 24 comprising a stout wire core 24a of hardened steel and a surrounding closed coil sheath 24b, the sheath 24b being of slightly less diameter than the groove 23 (Fig. 8).

The thrust member 17 nearer the discs 12, 15 has an additional part, the main part consisting of an inner L-sectioned angular part 17a slidable on the central bush 11 and the additional part consisting of an outer annular part 17b screwed on to the axial flange of the L-sectioned part 17a, relative rotation in one sense between these two parts advancing the outer part 17b axially towards the discs 12, 15. For locking the parts in set relative position use is made of the locking plate 13 associated with the disc assembly, such plate 13 having its series of holes 14 circumferentially arranged, into any one of which a plunger 25 in the advancing outer part 17b may be shot to hold such part 17b against further rotation. The plunger 25 is spring-loaded so as to normally be urged into engagement with the locking plate 13 (Fig. 5). The advancing part 17b has a transverse groove 26 giving access to the plunger 25 to allow of its being withdrawn from the locking plate 13 when adjustment is required, and also the plunger 25 is provided with a transverse pin 27 with protruding ends which limit its axial movement and also provide a means for its withdrawal. A tommy hole is provided so that with a tommy bar 28 inserted for carrying out adjustment the plunger 25 is held retracted by engagement thereof with one end of the pin 27 (Figs. 3 and 4).

The locking plate 13 is rotatably attached to the outer ring part 17b of the thrust member 17. An annular flange 17c is provided on the part 17b of the thrust member 17 on its outer circumference, and this is rolled over on to a bevelled edge of the locking plate 13 in such fashion that, although the locking plate 13 is securely held in close juxtaposition to the thrust member 17 it is rotatable independently of such member. This provision is most important as it prevents the plunger 25 escaping from the locking plate hole when the clutch is disengaged.

Spring-loaded members 29 are provided in recesses in the bush 11 which act so as normally to urge the thrust member 17 in such direction that the discs 12, 15 will disengage on release of the toggle links 19, 20.

In engaging the clutch the outermost thrust collar 18 with the tapered mouth is forced against the resilient spring 24 which, while substantially limiting the travel of the thrust collar 18, provides a spring-loaded effect through the compression of the closed coil 24b. This compression is controlled and the spring 24b is protected against crushing in the event of the clutch being over adjusted, by the solid wire core 24a which is very slightly smaller in diameter than the bore of the spring 24b, so that no damage will occur to the spring 24b. The resultant end pressure is imparted to the disc assembly to press the discs 12, 15 together, whilst at the same time the resilient spring device prevents the disc assembly from being "deadset."

The size of the semi-circular annular groove 23 in the central bush 11 is such that it allows the resilient spring 24b to assume a slightly oval shape when pressure is imposed in engaging the clutch, without possibility of the resilient spring 24b emerging from the groove 23 (see Figs. 6 and 7).

For effecting a major adjustment, for instance to take up wear of the discs 12, 15, the plunger 25 is retracted by means of the pin 27 and the part 17b of the thrust member 17 is rotated in the necessary sense by means of the tommy bar 28, the plunger 25 engaging a suitable hole 14 in the locking plate 13 when the tommy bar 28 is removed after adjustment is complete.

The invention, of course, is applicable to brakes in which case the one set of discs would be nonrotatable, or the friction clutches of the double-acting type.

In certain applications of the invention, for instance where clutches are incorporated in large paper-making machines where heavy loads are involved, the provision of further resilient means has been found desirable.

In Fig. 9 a pack 30 of three spring steel annuli is provided behind the disc assembly, being held near its inner diameter against a shoulder 11a on the bush 11 and at the other side, near its outer diameter against a raised surface 31a on an annular abutment ring 31.

In Fig. 10 a pack 30 of resilient annuli is similarly provided between the locking plate 13 and an annular abutment ring 32 which lies up against the front end of the disc assembly.

In Fig. 11 the outer thrust member 18 is in two parts 18a and 18b, a pack 30 of resilient annuli being similarly disposed between them.

It has been found that by using such additional resilient means the heavy loads can be connected to the drive by throwing in the clutch violently (as operators often do in practice) without there being any risk of damage to gear teeth, for instance. In each example illustrated in Figs. 9 to 11 the resilient pack will act as an annular leaf spring as the clutch lever is engaged and the drive will only engage gradually according to the load, the additional resiliency allowing it to slip in the initial stages.

The resilient annuli may be positioned in other places than those illustrated in Figs. 9 to 11. For instance the thrust member nearer the discs may be basically a two part member with the annuli disposed therebetween.

In general application instead of acting as an additional resilient means the pack (or a single resilient annulus of suitable characteristic) could be used alone, in which case the outer resilient member would be axially fixed and the split ring omitted.

What I claim is:

1. In a device of the type described, in combination, first and second coupling elements, said first coupling element being movable between a spaced position and a coupled position frictionally engaging said second coupling element; a supporting member supporting at least said first coupling element for movement toward and away from said second coupling element; first and second thrust means movably mounted on said supporting member, said first thrust means being located adjacent said first coupling element for actuating the same, said second thrust means having at the end thereof remote from said first thrust means a tapered mouth defining with said supporting member a wedge-shaped recess; resilient means urging said first thrust means away from said first coupling element; operating means for urging said first and second thrust means apart; and a resilient member located in said wedge-shaped recess and exerting its resilient pressure on said tapered mouth when said first and second thrust means are moved apart by said operating means for shifting said first coupling element to said coupled position.

2. In a device of the type described, in combination, first and second coupling elements, said first coupling element being movable between a spaced position and a coupled position frictionally engaging said second coupling element; a supporting sleeve member supporting at least said first coupling element for movement toward and away from said second coupling element, said supporting sleeve member having an annular groove; first and second thrust means movably mounted on said supporting sleeve member, said first thrust means being located adjacent said first coupling element for actuating the same, said second thrust means having at the end thereof remote from said first thrust means a tapered mouth defining with said supporting sleeve member a wedge-shaped recess in the region of said groove; resilient means urging said first thrust means away from said first coupling element; operating means for urging said first and second thrust means apart; and a resilient member located in said wedge-shaped recess and exerting its resilient pressure on said tapered mouth when said first and second thrust means are moved apart by said operating means for shifting said first coupling element to said coupled position, said resilient member including a resilient split ring, and a coil spring enveloping said split ring and being mounted in said annular groove and engaging said tapered mouth.

3. In a device of the type described, in combination, first and second coupling elements, said first coupling element being movable between a spaced position and a coupled position frictionally engaging said second coupling element; a supporting member supporting at least said first coupling element for movement toward and away from said second coupling element; first and second thrust means movably mounted on said supporting member, said first thrust means being located adjacent said first coupling element for actuating the same, said second thrust means having at the end thereof remote from said first thrust means a tapered mouth defining with said supporting member a wedge-shaped recess; resilient means urging said first thrust means away from said first coupling element; operating means for urging said first and second thrust means apart; a resilient member located in said wedge-shaped recess and exerting its resilient pressure on said tapered mouth when said first and second thrust means are moved apart by said operating means for shifting said first coupling element to said coupled position; said first and second thrust means and said first and second coupling elements being pressure bodies subjected to pressure in said coupling position, one of said pressure bodies having a first annular radially extending face, and one of said pressure bodies having a second annular radially extending face having a smaller diameter than said first annular face; and at least one spring annulus having an annular outer edge portion engaging said first annular face and having an annular inner edge portion engaging said second annular face so as to be resiliently deformed when the pressure on said pressure bodies exceeds a predetermined limit.

4. In a device of the type described, in combination, first and second coupling elements, said first coupling element being movable between a spaced position and a coupled position frictionally engaging said second coupling element; a supporting sleeve member supporting at least said first coupling element for movement toward and away from said second coupling element, said supporting sleeve member having an annular groove; first and second thrust means movably mounted on said supporting sleeve member, said first thrust means being located adjacent said first coupling element for actuating the same, said second thrust means having at the end thereof remote from said first thrust means a tapered mouth defining with said supporting member a wedge-shaped recess in the region of said groove; resilient means urging said first thrust means away from said first coupling element; operating means for urging said first and second thrust means apart; a resilient member located in said wedge-shaped recess and exerting its resilient pressure on said tapered mouth when said first and second thrust means are moved apart by said operating means for shifting said first coupling element to said coupled position, said resilient member including a resilient split ring, and a coil spring enveloping said split ring and being mounted in said annular groove and engaging said tapered mouth; said first and second thrust means and said first and second coupling elements being pressure bodies subjected to pressure in said coupling position, one of said pressure bodies having a first annular radially extending face, and one of said pressure bodies having a second annular radially extending face having a smaller diameter than said first annular face; and at least one spring annulus surrounding said sleeve member and having an annular outer edge portion engaging said first annular face and having an annular inner edge portion engaging said second annular face so as to be resiliently deformed when the pressure on said pressure bodies exceeds a predetermined limit.

5. In a device of the type described, in combination, first and second coupling elements, said first coupling element being movable between a spaced position and a coupled position frictionally engaging said second coupling element; a supporting member supporting at least said first coupling element for movement toward and away from said second coupling element; first and second thrust means movably mounted on said supporting member, said first thrust means being located adjacent said first coupling element for actuating the same, said second thrust means having at the end thereof remote from said first thrust means a tapered mouth defining with said supporting member a wedge-shaped recess; resilient means urging said first thrust means away from said first coupling element; operating means for urging said first and second thrust means apart; a resilient member located in said wedge-shaped recess and exerting its resilient pressure on said tapered mouth when said first and second thrust means are moved apart by said operating means for shifting said first coupling element to said coupled position; an annular part in threaded engagement with said first thrust means for varying the effective length of the same, said annular part having a circular inturned flange defining an annular recess; at least one spring-loaded pin mounted on said annular part; and a locking plate associated with said first coupling element and having spaced apertures, said locking plate engaging said annular recess so that said annular part is turnable between a plurality of angularly displaced positions in which said pin is located opposite different apertures, said pin projecting into the respective aperture so that said annular part is locked, said pin being retractable for turning adjustment of said annular part.

6. In a device of the type described, in combination, first and second coupling elements, said first coupling element being movable between a spaced position and a coupled position frictionally engaging said second coupling element; a supporting sleeve member supporting at least said first coupling element for movement toward and away from said second coupling element, said supporting sleeve member having an annular groove; first and second thrust means movably mounted on said supporting sleeve member, said first thrust means being located adjacent said first coupling element for actuating the same, said second thrust means having at the end thereof remote from said first thrust means a tapered mouth defining with said supporting sleeve member a wedge-shaped recess in the region of said groove; resilient means urging said first thrust means away from said first coupling element; operating means for urging said first and second thrust means apart; a resilient member located in said wedge-shaped recess and exerting its resilient pressure on said tapered mouth when said first and second thrust means are moved apart by said operating means for shifting said first coupling element to said coupled position, said resilient member including a resilient split ring, and a coil spring enveloping said split ring and being mounted in said annular groove and engaging said tapered mouth; an annular part in threaded engagement with said first thrust means for varying the effective length of the same, said annular part having a circular inturned flange defining an annular recess; at least one spring-loaded pin mounted on said annular part; and a locking plate associated with said first coupling element and having spaced apertures, said locking plate engaging said annular recess so that said annular part is turnable between a plurality of angularly displaced positions in which said pin is located opposite different apertures, said pin projecting into the respective aperture so that said annular part is locked, said pin being retractable for turning adjustment of said annular part.

7. A clutch comprising, in combination, a first clutch member; a second clutch member; an assembly of friction discs, one alternate series of friction discs being secured to said first clutch member, and the other alternate series of said friction discs being secured to said second clutch member; a bearing sleeve having an abutment for said assembly of said friction discs; a first annular thrust means slidably mounted on said bearing sleeve adjacent the side of said assembly of friction discs remote from said abutment; a second annular thrust means slidably mounted on said bearing sleeve, said second annular thrust means having an annular tapered mouth defining with said bearing sleeve a wedge-shaped recess; resilient means for urging said first thrust means away from said assembly of friction discs; operating means for urging said first and second thrust means apart; and a resilient member located in said wedge-shaped recess and exerting its resilient pressure on said tapered mouth when said first and second annular thrust means are moved apart by said operating means for shifting said two series of alternate discs into engaged coupling position.

8. A clutch comprising, in combination, a first clutch member; a second clutch member; an assembly of friction discs, one alternate series of friction discs being secured to said first clutch member, and the other alternate series of said friction discs being secured to said second clutch member; a bearing sleeve having an abutment for said assembly of said friction discs; a first annular thrust means slidably mounted on said bearing sleeve adjacent the side of said assembly of friction discs remote from said abutment; a second annular thrust means slidably mounted on said bearing sleeve, said second annular thrust means having an annular tapered mouth defining with said bearing sleeve a wedge-shaped recess; resilient means for urging said first thrust means away from said assembly of friction discs; operating means for urging said first and second thrust means apart; said first and said second annular thrust means, said assembly of discs and said abutment being pressure bodies subjected to pressure in said coupling position, one of said pressure bodies having a first annular radially extending face, and one of said pressure bodies having a second annular radially extending face having a smaller diameter than said first annular face; and at least one spring annulus surrounding said sleeve member and having an annular outer edge portion engaging said first annular face and having an annular inner edge portion engaging said second annular face so as to be resiliently deformed when the pressure on said pressure bodies exceeds predetermined limit.

9. A clutch comprising, in combination, a first clutch member; a second clutch member; an assembly of friction discs, one alternate series of friction discs being secured to said first clutch member, and the other alternate series of said friction discs being secured to said second clutch member; a bearing sleeve having an annular abutment; an annular abutment member having an annular face on one side and abutting on the other side thereof said assembly of said friction discs; a first annular thrust means slidably mounted on said bearing sleeve adjacent the side of said assembly of friction discs remote from said abutment; a second annular thrust means slidably mounted on said bearing sleeve, said second annular thrust means having an annular tapered mouth defining with said bearing sleeve a wedge-shaped recess; resilient means for urging said first thrust means away from said assembly of friction discs; operating means for urging said first and second thrust means apart; a resilient member located in said wedge-shaped recess and exerting its resilient pressure on said tapered mouth when said first and second annular thrust means are moved apart by said operating means for shifting said two series of alternate discs into engaged coupling position; and at least one steel spring annulus surrounding said bearing sleeve and abutting along the inner edge thereof said abutment and along the outer edge said annular face so as to be deformed when said two series of alternate discs are in engaged coupling position.

10. A clutch comprising, in combination, a first clutch member; a second clutch member; an assembly of friction discs, one alternate series of friction discs being secured to said first clutch member, and the other alternate series of said friction discs being secured to said second clutch member; a bearing sleeve having an abutment for said assembly of said friction discs, said bearing sleeve having an annular groove; a first annular thrust means slidably mounted on said bearing sleeve adjacent the side of said assembly of friction discs remote from said abutment; a second annular thrust means slidably mounted on said bearing sleeve, said second annular thrust means having an annular tapered mouth defining with said bearing sleeve a wedge-shaped recess in the region of said groove; resilient means for urging said first thrust means away from said assembly of friction discs; operating means for urging said first and second thrust means apart; and a resilient member located in said wedge-shaped recess and exerting its resilient pressure on said tapered mouth when said first and second annular thrust means are moved apart by said operating means for shifting said two series of alternate discs into engaged coupling position, said resilient member including a resilient split ring, and a coil spring enveloping said split ring and being mounted in said annular groove engaging said tapered mouth.

11. A clutch comprising, in combination, a first clutch member; a second clutch member; an assembly of friction discs, one alternate series of friction discs being secured to said first clutch member, and the other alternate series of said friction discs being secured to said second clutch member; a bearing sleeve having an abutment for said assembly of said friction discs; a first annular thrust means slidably mounted on said bearing sleeve adjacent the side of said assembly of friction discs remote from said abutment; a second annular thrust means slidably mounted on said bearing sleeve, said second annular thrust means having an annular tapered mouth defining with said bearing sleeve a wedge-shaped recess; resilient means for urging said first thrust means away from said assembly of friction discs; operating means for urging said first and second thrust means apart; resilient member located in said wedge-shaped recess and exerting its resilient pressure on said tapered mouth when said first and second annular thrust means are moved apart by said operating means for shifting said two series of alternate discs into engaged coupling position; an annular part in threaded engagement with said first thrust means for varying the effective length of the same, said annular part having a circular inturned flange defining an annular recess; at least one spring-loaded pin mounted on said annular part; and a locking plate associated with said first coupling element and having spaced apertures, said locking plate engaging said annular recess so that said annular part is turnable between a plurality of angularly displaced positions in which said pin is located opposite different apertures, said pin projecting into the respective aperture so that said annular part is locked, said pin being retractable for turning adjustment of said annular part.

12. A clutch comprising, in combination, a first clutch member; a second clutch member; an assembly of friction discs, one alternate series of friction discs being secured to said first clutch member, and the other alternate series of said friction discs being secured to said second clutch member; a bearing sleeve having an abutment for said assembly of said friction discs; a first annular thrust means slidably mounted on said bearing sleeve adjacent the side of said assembly of friction discs remote from said abutment; a second annular thrust means slidably mounted on said bearing sleeve, said second annular thrust means having an annular tapered mouth defining with said bearing sleeve a wedge-shaped recess in the region of said groove; resilient means for urging said first thrust means away from said assembly of friction discs; operating means for urging said first and second thrust means apart; a resilient member located in said wedge-shaped recess and exerting its resilient pressure on said tapered mouth when said first and second annular thrust means are moved apart by said operating means for shifting said two series of alternate discs into engaged coupling position, said resilient member including a resilient split ring, and a coil spring enveloping said split ring and being mounted in said annular groove engaging said tapered mouth; an annular part in threaded engagement with said first thrust means for varying the effective length of the same, said annular part having a circular inturned flange defining an annular recess; at least one spring-loaded pin mounted on said annular part; and a locking plate associated with said first coupling element and having spaced apertures, said locking plate engaging said annular recess so that said annular part is turnable between a plurality of angularly displaced positions in which said pin is located opposite different apertures, said pin projecting into the respective aperture so that said annular part is locked, said pin being retractable for turning adjustment of said annular part.

References Cited in the file of this patent

UNITED STATES PATENTS

| | | |
|---|---|---|
| 2,322,326 | Taylor | June 22, 1943 |
| 2,437,737 | Halby | Mar. 16, 1948 |
| 2,443,901 | Fast | June 22, 1948 |
| 2,578,308 | Iavelli | Dec. 11, 1951 |
| 2,639,015 | Wolf | May 19, 1953 |